United States Patent [19]

Dittakavi

[11] Patent Number: 4,602,152

[45] Date of Patent: Jul. 22, 1986

[54] BAR CODE INFORMATION SOURCE AND METHOD FOR DECODING SAME

[75] Inventor: Ashok Dittakavi, Lubbock, Tex.

[73] Assignee: Texas Instruments Incorporated, Dallas, Tex.

[21] Appl. No.: 497,637

[22] Filed: May 24, 1983

[51] Int. Cl.⁴ .............................................. G06K 7/10
[52] U.S. Cl. ..................................... 235/463; 235/436; 235/462
[58] Field of Search ......................... 235/436, 462, 463

[56] References Cited

U.S. PATENT DOCUMENTS

| | | | |
|---|---|---|---|
| 4,091,270 | 5/1978 | Musch et al. ................ | 235/462 X |
| 4,128,737 | 12/1978 | Dorais . | |
| 4,130,730 | 12/1978 | Ostrowski . | |
| 4,209,844 | 6/1980 | Brantingham et al. . | |
| 4,214,125 | 7/1980 | Mozer et al. . | |
| 4,308,455 | 12/1981 | Bullis et al. ...................... | 235/463 |
| 4,337,375 | 6/1982 | Freeman ...................... | 235/462 X |
| 4,398,059 | 8/1983 | Lin et al. . | |
| 4,488,678 | 12/1984 | Hara et al. ...................... | 235/462 X |

OTHER PUBLICATIONS

Claasen, Mecklenbrauker & Peek, "Some Considerations on the Implementation of Digital Systems for Signal Processing", Philips Res. Repts. 30, 1975, pp. 73-84.

Reference Guide: Bar Code Scanning; MSI Data Corporation, 1980, 64 pages.

Primary Examiner—David L. Trafton
Attorney, Agent, or Firm—William E. Hiller; Leo N. Heiting; Melvin Sharp

[57] ABSTRACT

There is disclosed a method and apparatus for decoding coded information such as may be provided by a printed bar code. The coded information is segmented into a plurality of words, each having more bits than the number of bits appearing in the corresponding decoded word. The bits of each coded word are subdivided into at least two partial coded words. Each of these partial coded words is then decoded and the decoded versions for all the partial coded words combined so as to yield the decoded word. In the preferred embodiment the method of combination is summation of the decoded partial coded words.

8 Claims, 6 Drawing Figures

BAR CODE INFORMATION SOURCE AND METHOD FOR DECODING SAME

BACKGROUND OF THE INVENTION

The present invention relates to the decoding of digital information.

Frequently in dealing with digital information, the incoming information will be in a particular format, whereas it becomes necessary to convert the format of the data into a form that is suitable for subsequent use. In some cases there may be certain restrictions on the nature of the input data format. If the input data is segmented into a plurality of multibit binary words, then the number of different combinations within any given binary word is a function of the number of bits within the word. If a word contains eight bits, for example, 256 different combinations of these "ones" and "zeros" are available. However, if a restriction is imposed on the particular set of "ones" and "zeros", then one no longer has the total 256 combinations available for use. In such case the corresponding decimal numbers that are available would be distributed in somewhat random fashion between the values 0 and 255. It may be desirable, however, that each of the available combinations be utilized to address a particular number within a sequence of contiguous numbers. Consequently, it becomes necessary to decode the input data so as to convert it to the addresses available within the address space of contiguous numbers.

One method of doing this is to utilize a single level table look up method. In this case the table, which is typically stored in semiconductor memory, has a number of locations equal to the number of combinations that are possible in the input code. In the example discussed above, this would be 256. At each location there is an output entry which comprises the decoded address corresponding to the specific input word. The number of memory locations required by this method in some cases is objectionable.

SUMMARY OF THE INVENTION

In the preferred embodiment of the present invention, the input data appears in the form of an optically detectable bar code. The bar code is bar width modulated, that is the width of the white and black bars is indicative of whether a "one" a "zero" is represented. Because of a finite space limitation on the bar code, it is desirable to utilize a code in which the narrow bars predominate. If the narrow bars represent "ones" in this code, it will be referred to as a "ones" intensive bar code.

The data represented by the bar code is decoded and used to address certain synthetic speech information available within semiconductor memory of a speech synthesis apparatus. The data may also be used to control certain activity functions in the apparatus. While the addresses for the memory have lengths of eight bits, the input bar code is divided into words each comprising nine bits of information. In the preferred embodiment, each nine bit word is divided into a first partial word comprising the five most significant bits and a second partial word comprising the four least significant bits. Each of these partial words is then used to address either a five bit or four bit lookup table as the case may be, and the outputs of the two lookup tables are summed to produce the ultimate eight bit decoded address. Whereas the single level lookup table discussed under the background of the invention would require 512 input entries, the five bit and four bit lookup tables comprise 32 and 16 entries respectively. While a small amount of additional code is required to provide the combination of the lookup table outputs so as to provide the ultimately decoded eight bit word, the total amount of memory space required for the practice of the present invention is substantially less than that which was required by the prior art.

It is therefore an object of the invention to provide a data source for coded data which comprises a support material and means associated with the support material and representative of a plurality of multibit binary words, each of the binary words further comprising at least two multibit binary partial words each defining a numerical value which, when combined with the numerical values defined by the other partial words, represents a decoded version of the corresponding multibit binary word.

It is another object of the invention to provide apparatus for decoding multibit binary words which includes means for dividing each of the binary words into at least two partial words, means for converting each of the partial binary words into a corresponding numerical value, and means for combining the corresponding numerical values to provide a decoded word. These and other objects and features of the invention may be more fully appreciated by consideration of the following description taken in connection with the associated drawings wherein:

DESCRIPTION OF THE PREFERRED EMBODIMENT

Figure 1:
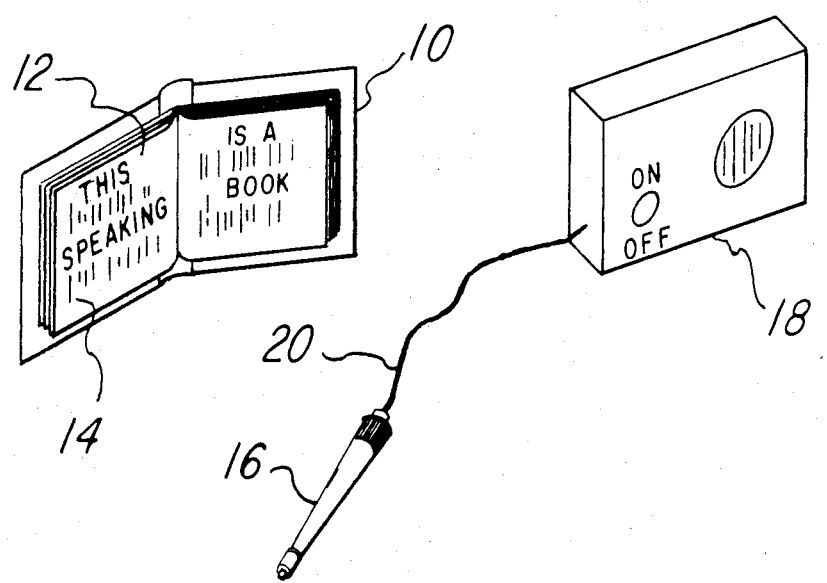
FIG. 1 illustrates a combination comprising a book and automatic speaking apparatus.

FIG. 1 is an illustration of the invention in its preferred embodiment. There is disclosed a book 10 of conventional construction. The pages of the book contain readable textual material such as illustrated at 12. Below each line of readable material there is disposed a corresponding line comprised of bar codes as illustrated at 14. Bar codes as a general concept are well known as will be recognized by those familiar with their use in identifying grocery products and the like. In the case illustrated in FIG. 1, the bar codes correspond to the textual material immediately above and serve to provide coded information to apparatus 18 which synthesizes audible versions of the corresponding words 12. The binary coded information represented by bar code 14 is detected by light pen 16. This binary information is coupled to synthesizing apparatus 18 by an electrical connector 20. An example of the preferred embodiment as illustrated in FIG. 1 is the Magic Wand ™ Speaking Reader and the books provided therefor, all available from Texas Instruments Incorporated of Dallas, Tex. Of course, the medium containing the bar code 14 need not be a book, but could be any material from which it is desired to acquire coded information. For the purposes of this description and the claims appended hereto, the term "binary" shall be interpreted to include radix systems other than two, such as octal or hexadecimal.

The technology used to synthesize the spoken words in the preferred embodiment is linear predictive coding (LPC). In this technique, a sequence of frames of digital information is provided to a synthesizer. The synthesizer is controlled by this digital information so as to generate an analog waveform which, when amplified and coupled to a speaker, results in audible material. One such linear predictive coding synthesizer is disclosed in U.S. Pat. No. 4,209,836 which is assigned to Texas Instruments. In theory it is possible that the bar code 14 may comprise such a sequence of frames of digital information which is coupled directly to the synthesizer so as to generate speech. In this case, however, the volume of data required to generate quality speech is not consistent with the limited amount of space available beneath the textual material 12 in view of achievable bar code resolution. One alternative is to have the frames of digital information stored internally in unit 18 such as by way of a semiconductor read only memory (ROM). A much lower density bar code may then be used to address the appropriate sequences of frames from the ROM to control the synthesizer. Each sequence of frames may correspond to a specific word and be located at a unique place in the ROM. The bar code beneath individual words then may be utilized to address the appropriate sequence of frames for that word in the ROM. Another alternative would be to store the sequences of frames for entire phrases or sentences. While this would substantially reduce the flexibility of the system, an even lower bar code density would be required.

In the preferred embodiment of the present invention, the sequences of frames correspond to portions of words, referred to as allophones. The use of allophones in connection with a linear predictive coding synthesizer is disclosed in copending U.S. patent application Ser. No. 240,693, filed Mar. 5, 1981, now U.S. Pat. No. 4,398,059 issued Aug. 9, 1983 and also assigned to Texas Instruments. In this case the bar codes beneath a particular word in book 10 serve to identify the specific set of allophones that is required to pronounce the corresponding word.

Figure 2:
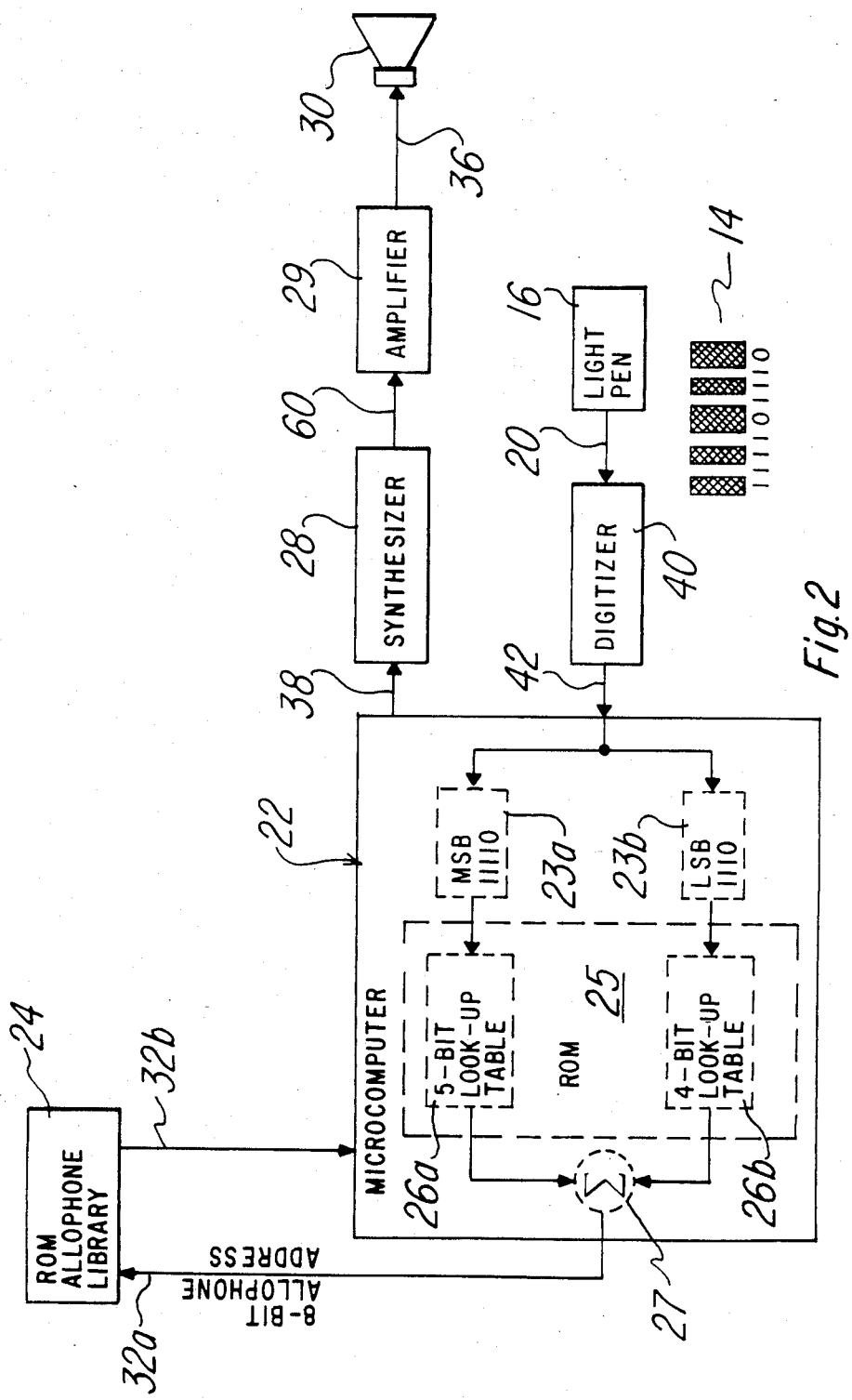
FIG. 2 is a block diagram of the automatic speaking apparatus.

A block diagram of the apparatus in unit 18 is illustrated in FIG. 2. Here the binary information represented by the bar code 14 and detected by light pen 16 is coupled by line 20 to digitizer 40 and from there by line 42 to a microcomputer 22. Microcomputer 22 may be comprised of a microprocessor and associated ROM memory 25 containing the processing instructions that cause the microprocessor and other circuits to function as a speech producing unit. Alternatively the ROM may be included as part of the microprocessor chip. In the preferred embodiment, it is a Texas Instruments TMS 7040 microcomputer. The binary information is decoded by microcomputer 22 to form a set of allophone addresses and prosody information to be used in synthesizing the audible information. The binary information may also represent certain activity codes in specific applications of the invention. The allophone addresses are coupled by line 32a to ROM library 24. The ROM may be a TMS 0430 memory. Each allophone address accesses the sequence of binary information (LPC data resident in the ROM allophone library 24) via line 32b required to ultimately control synthesizer 28 to generate an analog version of the allophone. The sequences of digital data are smoothed and modified as necessary based on the prosody information under control of microcomputer 22 and coupled via line 38 to synthesizer 28. The assembled LPC data is coupled via line 38 to synthesizer 28 to produce an analog waveform representing the word on line 60. This electrical signal is amplified by amplifier 29 and then converted by speaker 30 to an audible version of the word. Synthesizer 28 is disclosed in the previously mentioned U.S. Pat. No. 4,209,836.

The number of allophones required to produce a given word is approximately equal to the number of letters in the word. Thus the number of allophone identifications that must be provided by bar code 14 for each word is approximately equal to the number of letters in that word. It will be appreciated therefore that a substantially higher bar code density is required in the case of allophone speech than in the case of speech where the LPC data is grouped in ROM 24 for complete words. In the latter case, of course, only a single word identification must be provided by bar code 14 for each word. In the case of allophone speech, the efficiency of bar code 14 becomes very important. Efficiency here might be defined as the average number of allophone identifications provided by a unit length of bar code. In accordance with the principles of the invention, there is provided a particularly efficient means of encoding the bar code.

Figure 3:
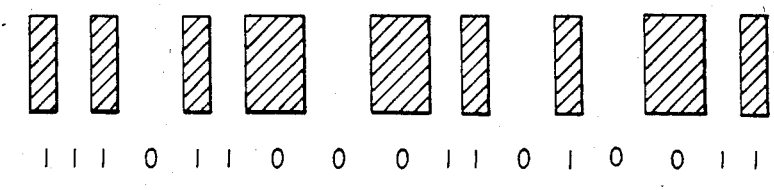
FIG. 3 is an example of the bar code utilized as a portion of the book.

In a two color (black or white) bar code, the binary data is represented by black and white bars. The particular convention utilized to represent "ones" and "zeros" in the preferred embodiment of the invention is bar width modulation. In this case the black and white bars may have either of two widths, the wider bars being twice the width of the narrower bars. Binary "ones" are represented by either black or white narrow bars, whereas binary "zeros" are represented by black or white wide bars. An example of this convention is illustrated in FIG. 3.

Figure 4A:
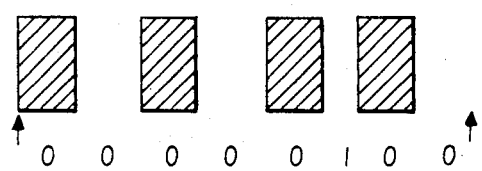
FIGS. 4a and 4b illustrate a typical word from a normal bar code and a typical word from a "ones" intensive bar code.
Figure 4B:
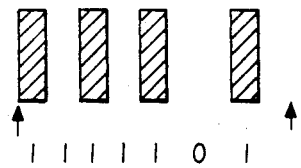

A set of 128 allophones is used in the preferred embodiment of the present invention. Each allophone identification must carry with it an extra bit to indicate whether or not it is the last allophone in a word. As a result, bar code 14 must transfer a minimum of eight bits for each specific allophone identification. Many of these eight bits words will contain a preponderance of "zeros", particularly those corresponding to lesser decimal values. This is illustrated in FIGS. 4a and 4b wherein the eight bit bar codes corresponding to the decimal numbers 4 and 251 respectively are illustrated. The physical area occupied by the former is 67% longer than that occupied by the latter. The use of bar code words having a preponderance of "zeros" is clearly unattractive both because it causes the average length of the bar code words to be higher and also results in considerable variation in the length of the bar code words.

In accordance with the principles of this invention, a nine bit bar code word is utilized in lieu of the eight bit word discussed above. Only those nine bit bar code words having a preponderance of "ones" (four or fewer "zeros") is used. Half of the total set of nine bit bar code words does have this "ones" intensive feature and this specific subset is the one utilized to address the allophones in ROM allophone library 24.

The use of a subset of the available nine bit bar code words introduces the need for a decoding mechanism. The 128 allophones in ROM allophone library 24 are located at the 128 contiguous addresses zero through 127. On the other hand, the addresses available from the selected subset of nine bit bar code words are dispersed somewhat randomly up to a maximum decimal value of 511. Thus the available set of addresses from the bar code does not correspond to the set of addresses required to access the allophones.

It is possible to use a lookup table to decode the addresses available from the bar code so as to translate them to the corresponding addresses in the allophone ROM. This is illustrated for a very simple situation in Table 1. Here it is assumed that it is only necessary to address four different allophones. However, in order to have a "ones" intensive bar code, three bit bar code words are utilized. The Table shows the four available three bit words that are "ones" intensive and relates them to corresponding allophone addresses.

TABLE 1

| "Ones" Intensive Three Bit Words | Allophone Addresses |
| --- | --- |
| 011 | 00 |
| 101 | 01 |
| 110 | 10 |
| 111 | 11 |

In the preferred embodiment of the present invention, it is necessary to be able to address 256 different ROM locations (here considering the 7-bit address with extra bit 0 which signifies more allophones to come in the word to be a different address than the same 7-bit address with extra bit 1 to signify that this is the last allophone in the word). Accordingly, if the one step table lookup scheme as illustrated in Table 1 is used, the table would have to have 512 entries, 256 comprising the various allophone addresses and 256 comprising the corresponding "zero" intensive nine-bit bar code words. Since the cost of semiconductor memory increases with the capacity of the memory, it would be desirable to reduce the demand on memory imposed by this single level table lookup mechanism. As will now be described, the invention provides a more efficient means for decoding the "ones" intensive words available from the bar code.

When microcomputer 22 operating under control of the program in its ROM 25 receives the nine bit data words from light pen 16, it first divides the nine bit word into two shorter words, the first comprising the most significant five bits (i.e. MSB as at 23a) and the second comprising the least significant four bits (i.e. LSB as at 23b) of the nine bit word. The five bit word is used to access a look-up table 26a located in the ROM 25 of microcomputer 22 and having entries as illustrated in Table 2.

TABLE 2

| 5 BITS FOR 4/9 TABLE ENTRY | DECIMAL VALUE |
| --- | --- |
| 0 | INVALID |
| 1 | 27 |
| 2 | 28 |
| 3 | 17 |
| 4 | 29 |
| 5 | 19 |
| 6 | 18 |
| 7 | 7 |
| 8 | 30 |
| 9 | 22 |
| 10 | 21 |
| 11 | 10 |
| 12 | 20 |
| 13 | 8 |
| 14 | 9 |
| 15 | 1 |
| 16 | 31 |
| 17 | 26 |
| 18 | 25 |
| 19 | 16 |
| 20 | 24 |
| 21 | 14 |
| 22 | 15 |
| 23 | 6 |
| 24 | 23 |
| 25 | 11 |
| 26 | 12 |
| 27 | 2 |
| 28 | 13 |
| 29 | 5 |
| 30 | 3 |
| 31 | 4 |

The five most significant bits from any nine bit word to be decoded are used to find a location in the left hand column of Table 2 labeled "table entry". This provides identification of a corresponding first numerical value illustrated in the right hand column of Table 2. Whereas the information represented by the right hand column will be in binary form within the microcomputer, for convenience the decimal values have been illustrated in Table 2. In like manner, the four least significant bits of any nine bit word to be decoded provide access to a specific location in look-up table 26b having entries as illustrated in Table 3 and serve to identify a corresponding second numerical value as illustrated in the right hand column of Table 3.

TABLE 3

| 4 BITS FROM 4/9 TABLE ENTRY | DECIMAL VALUE |
| --- | --- |
| 0 | −4 |
| 1 | 249 |
| 2 | 243 |
| 3 | 215 |
| 4 | 237 |
| 5 | 199 |
| 6 | 183 |
| 7 | 109 |
| 8 | 231 |
| 9 | 167 |
| 10 | 151 |
| 11 | 83 |
| 12 | 135 |
| 13 | 57 |
| 14 | 31 |
| 15 | 0 |

It will be noted that table entry 0 in Table 2 is indicated as being an invalid entry. This is because the five most significant bits of the nine bit word would have to all be "zero" in order to have a table entry 0 in Table 2. This, of course, is inconsistent with the "ones" intensive requirement. After the first and second numerical values have been identified, the microcomputer 22 sums these two values via a summer 27 to arrive at the address of the specific allophone in allophone ROM 24. Thus by way of example, if the nine bit word to be decoded is 111101110, the microcomputer 22 would use the five most significant bits as at 23a to identify, via look-up table 26a, table entry 30 in Table 2 and find a numerical value of 3. Similarly, the least significant four bits as at 23b would be utilized to find, via look-up table 26b, table entry 14 in Table 3 with a second numerical value of 31. The sum of the two numerical values, 34, is the address of the allophone to be accessed from allophone ROM 24.

Certain combinations of entries from Tables 2 and 3 can not be accessed simultaneously. If table entries 1 in both tables were accessed for a given nine bit word, the first and second numerical values would be 249 and 27, so that the sum used to address ROM 24 would be 276. This would be an invalid address for the allophone ROM. However, for these specific table entries to be accessed by the same nine bit word would require that the most significant five bits include four "zeros" and the least significant four bits would have the three "zeros". This nine bit word, of course, would be "zero" intensive and is not one of the nine bit words that is utilized in developing the bar code to be used in book 10.

Tables 2 and 3 taken together have a total of 48 entries as contrasted with the 512 entries that are required to do a single stage table lookup. While certain space must be reserved in the ROM 25 of microcomputer 22 for the code utilized in performing the two table lookups and summation of the numerical values developed thereby, the total amount of ROM space consumed by the two tables 26a and 26b and the relatively small associated code is still small in comparison with the 512 entries that would be required in the alternative scheme. Thus the practice of the invention makes possible the utilization of bar code words having short and relatively constant lengths. Operation of microcomputer 22 under control of its ROM 25 to implement the unique decoding method of this invention is well understood by those of ordinary skill in the art and need not be further discussed here.

It should be noted that the first and second numerical values provided by Tables 2 and 3 are not unique. As a trivial example of this, the decimal value 1 could be added to each of the entries in Table 2 and the decimal value 1 subtracted from each of the numerical entries in Table 3 and the same overall results would be achieved. Also, while the invention has been illustrated using two hookup tables, 26a and 26b it will be obvious to those skilled in the art that it is possible to extend the concept to a greater number of lookup tables. In such cases there may be a net reduction in the total number of lookup table entries required, but there may be a corresponding increase in the amount of code required to perform the table lookups and the combination of the resultant numerical values identified. The specific details of a particular application would dictate the optimum number of lookup tables to utilize.

Figure 5:
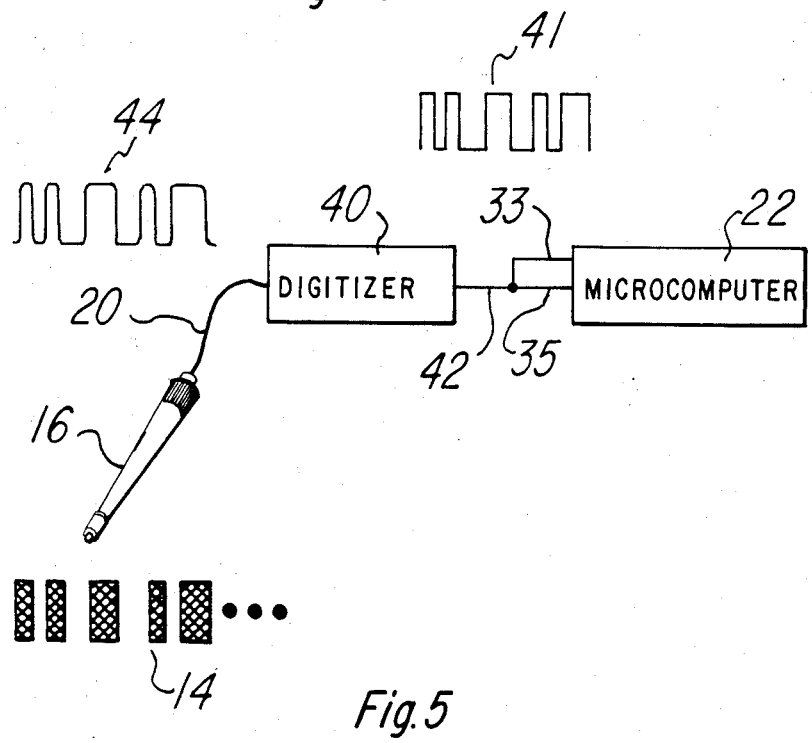
FIG. 5 shows details of the apparatus utilized to convert the bar code into a sequence of "ones" and "zeros" within a microcomputer.

The conversion of the bar codes to digital information which may be utilized by microcomputer 22 is illustrated in FIG. 5. A short portion of bar code 14 is illustrated to be comprised of a sequence of narrow and wide black and white bars. This is converted by light pen 16 into an analog waveform which is amplified within the pen to provide on line 20 a waveform such as that illustrated at 44. This analog waveform is further amplified and clipped in digitizer 40 to provide a square wave waveform having well defined upper and lower voltage levels as illustrated at 46. This is coupled by line 42 to microcomputer 22. The signal is coupled both to pin 33 of the microcomputer which is an interrupt pin and pin 34 which detects the level of the logic signal. The interrupt signal serves to initiate an interval timer which is used to determine the time length of a bar, and consequently whether it represents a 1 or a 0. Pin 34 is used to detect the logic level of the signal so as to determine whether it represents a white or a black bar. In this way the microcomputer 22 acquires the sequence of "ones" and "zeros" represented by the bar code for subsequent use there as has been described herein.

Whereas there has been disclosed a specific embodiment of the invention, variations which do not depart from the spirit and scope of the invention may suggest themselves to persons of ordinary skill in the art. Such minor variations are intended to fall within the scope of the claims.

What I claim is:

1. A bar code information source for providing coded data comprising:
   a support material providing a surface on which coded data is to be disposed;
   bar code means disposed on the surface of said support material and defining a plurality of data bar spaces adapted to provide bar code data to be retrieved, said plurality of data bar spaces differing in appearance as between dark and light regions and in width dependent upon the information content represented thereby;
   said plurality of data bar spaces being arranged in a plurality of respective multibit binary words of bar code, each word having a predetermined number of bits of data;
   each respective multibit binary word as provided by said plurality of data bar spaces being defined by a plurality of multibit binary partial words including a first partial word having a first preselected number of the most significant bits of data and representative of a first numerical value and at least another partial word having a second preselected number of the least significant bits of data and representative of another numerical value; and
   the numerical values represented by said plurality of partial words defining a respective multibit binary word upon being combined being representative of a decoded version of the corresponding multibit binary word having a plurality of bits reduced in number as compared to said predetermined number of bits of data constituting the respective word of bar code.

2. A bar code information source as set forth in claim 1, wherein said data bar spaces comprise first bar spaces of relatively narrow width and second bar spaces of relatively wide width as compared to said first bar spaces of relatively narrow width;
   said first bar spaces being representative of one binary value, and said second bar spaces being representative of the other binary value; and
   said first bar spaces substantially predominating in number as compared to said second bar spaces.

3. A bar code information source as set forth in claim 2, wherein only bar code words with the predetermined number of bits of data in which a preponderance of said first bar spaces occurs as compared to said second bar spaces are present.

4. A bar code information source as set forth in claim 3, wherein said first bar spaces are respectively representative of "one", and said second bar spaces are respectively representative of "zero".

5. A method of decoding a bar code comprising a plurality of data bar spaces adapted to provide bar code data to be retrieved, wherein said data bar spaces differ in appearance as between dark and light regions and in width dependent upon the information content represented thereby, said plurality of data bar spaces being arranged in respective words of bar code each having a predetermined number of bits of data; said method comprising the steps of:

dividing respective words of bar code into a plurality of partial words including a first partial word having a first preselected number of the most significant bits of data and at least another partial word having a second preselected number of the least significant bits of data;

addressing a first lookup table having a plurality of addresses, each of which is defined by said first preselected number of bits, with said first partial words to derive an output from said first lookup table corresponding to the address as determined by said first preselected number of the most significant bits of data of said first partial word;

addressing at least another lookup table having a plurality of addresses, each of which is defined by said second preselected number of bits, with said another partial word to derive an output from said another lookup table corresponding to the address as determined by said second preselected number of the least significant bits of data of said another partial word; and summing all of the outputs from said lookup tables corresponding to the addresses as determined from said plurality of partial words defining a respective word to produce a resultant decoded address having a plurality of bits reduced in number as compared to said predetermined number of bits of data constituting the respective word of bar code.

6. A method of decoding a bar code as set forth in claim 5, wherein said data bar spaces comprise first bar spaces of relatively narrow width and second bar spaces of relatively wide width as compared to said first bar spaces of relatively narrow width;

representing one binary value by each of said first bar spaces;

representing the other binary value by each of said second bar spaces; and arranging the bar code data such that said first bar spaces substantially predominate in number as compared to said second bar spaces prior to the division of respective words of bar code into partial words.

7. A method of decoding a bar code as set forth in claim 6, further including employing only words of bar code with said predetermined number of bits of data in which a preponderance of one binary value occurs in the bits of data defining the word as compared to the other binary value.

8. A method of decoding a bar code as set forth in claim 7, wherein each of said first bar spaces is respectively representative of "one", and each of said second bar spaces is respectively representative of "zero".

* * * * *